United States Patent
Upp et al.

(10) Patent No.: US 7,349,444 B2
(45) Date of Patent: Mar. 25, 2008

(54) SONET/SDH SPE/VIRTUAL CONTAINER RETIMING WITH ADAPTIVE DUAL POINTER LEAK RATE COMPUTATION

(75) Inventors: Daniel C. Upp, Southbury, CT (US); Suvhasis Mukhopadhyay, Shrewsbury, MA (US); Bart Brosens, Oelegem (BE); Kris Van Aken, Kessel-Lo (BE); Chitra Wadhwa, Sonepat (IN); Sachin Mathur, Bangalore (IN); Ramses Valvekens, Herent (BE)

(73) Assignee: Transwitch Corporation, Shelton, CT (US)

( * ) Notice: Subject to any disclaimer, the term of this patent is extended or adjusted under 35 U.S.C. 154(b) by 717 days.

(21) Appl. No.: 10/924,046

(22) Filed: Aug. 23, 2004

(65) Prior Publication Data

US 2006/0039415 A1    Feb. 23, 2006

(51) Int. Cl.
*H04J 3/06* (2006.01)

(52) U.S. Cl. ..................... 370/509; 370/235.1
(58) Field of Classification Search ............. 370/235.1
See application file for complete search history.

(56) References Cited

U.S. PATENT DOCUMENTS

| | | | |
|---|---|---|---|
| 4,941,156 A | 7/1990 | Stern et al. | 375/372 |
| 4,996,698 A | 2/1991 | Nelson | 375/372 |
| 5,030,951 A | 7/1991 | Eda et al. | 370/102 |
| 5,040,170 A | 8/1991 | Upp et al. | 370/99 |
| 5,065,396 A | 11/1991 | Castellano et al. | 370/84 |
| 5,142,529 A | 8/1992 | Parruck et al. | 370/84 |
| 5,157,655 A | 10/1992 | Hamlin, Jr. et al. | 370/102 |
| 5,257,261 A | 10/1993 | Parruck et al. | 370/522 |
| 5,289,507 A | 2/1994 | Upp | 375/372 |
| 5,297,180 A | 3/1994 | Upp et al. | 375/112 |
| 5,331,641 A | 7/1994 | Parruck et al. | 370/102 |
| 5,390,180 A | 2/1995 | Reilly | 370/476 |
| 5,717,693 A | 2/1998 | Baydar et al. | 370/514 |
| 6,577,651 B2 * | 6/2003 | Singh et al. | 370/509 |

* cited by examiner

*Primary Examiner*—Doris H. To
*Assistant Examiner*—Redentor Pasia
(74) *Attorney, Agent, or Firm*—Gordon & Jacobson, PC

(57) ABSTRACT

Methods for retiming SONET signals include demultiplexing STS-1 signals from an STS-N signal, buffering each of the STS-1 signals in a FIFO, determining the FIFO depth over time, and determining a pointer leak rate based in part on FIFO depth and also based on the rate of received pointer movements. According to the presently preferred embodiment, each FIFO is 29 bytes deep. If FIFO depth is 12-17 bytes, no leaking is performed. If the depth is 8-12 bytes or 17-21 bytes, a slow leak rate is set. If the depth is 4-8 bytes or 21-25 bytes, a fast leak rate is set. If the depth is 0-4 bytes or 25-29 bytes, pointer movements are immediate. The calculated leak rates are based on the net number of pointer movements (magnitude of positive and negative movements summed) received during a sliding window of n×32 seconds (n×256,000 frames).

28 Claims, 3 Drawing Sheets

```
1   main()
2   {
3   STa= inita; \*initial spacing STa = reset value = 3.75 ms, or 0xF*\
4   STb= initb; \*initial spacing STb = 3.75 ms, or 0xF *\
5   for (i=0;i<(NTM-1);i++)
6       {
7       NP[i]=0; \*zero all count buckets; note that NP are signed*\
8       }
9   nt=1; \*start summing over one interval*\
10  while(not overflow) \* from FIFO status registers*\
11      {
12      pcount = number of outgoing positive PJ in time interval Tx; \*from NPJCx*\
13      ncount = number of outgoing negative PJ in time interval Tx; \*from NNJCx*\
14      sum=0; \*initialize sum of counts*\
15      for (i=NTM-1;i>0;i--)
16          {
17          NP[i]=NP[i-1] \*shift count buckets, drop oldest (highest #)*\
18          sum += NP[i]; \*perform sum of pointer counts*\
19          }
20      NP[0]=pcount-ncount;
21      sum+=NP[0];
22      average=ABS(sum/(nt*Tx)): \*total pointers *over sliding time window*\
23      if (nt<NTM)
24          nt+=1; \*increase window size up to maximum - NTM*\
25      if (average==0)
26          {
27          STa = LS;
28          STb = LS;
29          }
30      else if ( Kb*(average)-1 >= LS)
31          {
32          STa=LS; \*set long pointer spacing, with Ka > 1, where average*\
33          STb=LS; \* spacing = (average)-1; else set short pointer spacing*\
34          } \* with Kb < 1. *\
35      else if ( (Kb*(average)-1 < LS) && (Ka*(average)-1 >= LS) )
36          { \*If average = 0, or, Kb*(average)-1 >= LS, then set both*\
37          STa=LS; \*STa, STb = LS; if only Ka*(average)-1 >= LS, then set *\
38          STb=Kb*(average)-1; \*STa = LS; but STb = Kb*(average)-1; otherwise, STa *\
39          } \*gets Ka*(average)-1; and STb gets Kb*(average)-1. *\
40      else
41          {
42          STa=Ka*(average)-1;
43          STb=Kb*(average)-1;
44          }
45      }
46  restart
47  }
```

FIG. 3

SONET/SDH SPE/VIRTUAL CONTAINER RETIMING WITH ADAPTIVE DUAL POINTER LEAK RATE COMPUTATION

This application is related to co-owned U.S. Pat. No. 5,331,641 and U.S. Pat. No. 6,577,651, the complete disclosures of which are hereby incorporated herein by reference.

BACKGROUND OF THE INVENTION

1. Field of the Invention

The invention relates to telecommunications. More particularly, the invention relates to methods and apparatus for calculating a pointer leak rate for retiming a SONET signal.

2. State of the Art

Since the early nineteen sixties, three different digital multiplexing and signaling hierarchies have evolved throughout the world. The hierarchies were developed in Europe, Japan, and North America. Fortunately, all are based on the same pulse code modulation (PCM) signaling rate of 8,000 samples per second, yielding 125 microsecond sampling slots (1 second/8,000 samples=0.000125). Japan and North America base their multiplexing hierarchies on the DS-1 rate of 1.544 Mbit/sec±20 ppm, although the higher data rates in Japan do not correspond to the higher rates used in North America. Europe bases multiplexing on a rate of 2.048 Mbits/sec called E1 which carries thirty voice circuits compared to the twenty-four carried in the DS-1 rate. The next most common higher rates in the U.S. and Europe are DS-3 and E3, respectively, which have rates of 44.736 Mbit/sec±20 ppm and 34.368 Mbit/sec±20 ppm, respectively.

The Synchronous Optical Network (SONET) or the Synchronous Digital Hierarchy (SDH), as it is known in Europe, is a common transport scheme which is designed to accommodate both DS-1 and E1 traffic as well as multiples (DS-3 and E3) thereof. Developed in the early 1980s, SONET has a base (STS-1) rate of 51.84 Mbit/sec in North America. In Europe, the base (STM-1) rate is 155.520 Mbit/sec, equivalent to the North American STS-3 rate (3*51.84=155.520). The abbreviation STS stands for Synchronous Transport Signal and the abbreviation STM stands for Synchronous Transport Module. STS-n signals are also referred to as Optical Carrier (OC-n) signals when transported optically rather than electrically.

The basic STS-1 signal which has a frame length of 125 microseconds (8,000 frames per second) and is organized as a frame of 810 octets (9 rows by 90 byte-wide columns). The first three columns of each row consist of transport overhead (TOH). Of these twenty-seven octets, nine are allocated for section overhead and eighteen are allocated for line overhead. The remainder of the frame (9 rows of 87 columns=783 octets) is referred to as the envelope or Synchronous Payload Envelope (SPE) or, in Europe, the Virtual Container. The first column of the envelope is reserved for STS path overhead (POH) and is referred to as the transport part of the envelope. The remaining 86 columns is referred to as the user part of the envelope. "Path" represents the complete transit through the SONET network. "Line" represents transit from one multiplexer to another. "Section" represents transit from one network element to another.

In order for data to be accommodated efficiently in the SPE, the 87 bytes of the SPE are divided into three blocks each including 29 columns. The POH occupies column 1 and "fixed stuff" (bytes which convey no information) is inserted into the 30th and 59th columns. Data is accommodated in the remaining 3*28=84 columns=756 bytes. An STS-n signal is comprised of n STS-1 signals which are frame aligned and byte-interleaved. An STS-nC signal is comprised of n STS-1 signals which are frame aligned and concatenated. Currently, the highest level STS signal is STS-192 which has a line rate of 9,953.28 Mbit/sec.

These various synchronous optical network signals contain payload pointers which provide a method of allowing flexible and dynamic alignment of the SPE (Virtual Container) within the envelope or container capacity, independent of the actual contents of the envelope or container. Dynamic alignment means that the STS or STM respective SPE or Virtual Container is allowed to float within the STS/Virtual Container envelope capacity/container. For example, an STS-1 SPE may begin anywhere in the STS-1 envelope capacity. Typically, it will begin in one STS-1 frame and end in the next frame. The STS payload pointer is contained in the H1 and H2 bytes (the first two bytes) of the line overhead. These two bytes designate the location of the payload byte (the J1 byte) where the STS SPE begins.

When first generated, an SPE is aligned with the line overhead at the originating node (i.e., the pointer value is fixed to some value from 0 to 782). As the frame is carried through a network, however, it arrives at intermediate nodes (e.g., multiplexers or cross-connects) having an arbitrary phase with respect to the outgoing transport framing of the intermediate nodes. If the SPE had to be frame-aligned with the outgoing signal, the frame would need to be buffered and delayed. Thus, the avoidance of frame alignment allows SPEs on incoming links to be immediately relayed to outgoing links without artificial delay. The location of the SPE in the outgoing payload envelope is specified by setting the H1, H2 pointer to the proper value (0-782). The pointer values are regenerated at each intermediate node in the network.

In addition, if there is a frequency offset between the frame rate of the transport overhead and that of the STS SPE, then the pointer value will be incremented or decremented, as needed, accompanied by a corresponding positive or negative stuff byte. If the frame rate of the STS SPE is too slow with respect to the transport overhead, then the alignment of the envelope must periodically slip back in time, and the pointer must be incremented by one. This operation is indicated by inverting selected odd bits (I-bits) of the pointer word to allow five-bit majority voting (or 8 out of 10 as per Bellcore requirements) at the receiver. A positive stuff byte appears immediately after the H3 byte in the frame containing inverted I-bits. Subsequent pointers will contain the new offset value.

If the frame rate of the STS SPE is too fast with respect to that of the transport overhead, then the alignment of the envelope must be periodically advanced in time, and the pointer must be decremented by 1. This operation is indicated by inverting selected even bits (D-bits) of the pointer word to allow five-bit majority voting at the receiver. A negative stuff byte appears in the H3 byte in the frame containing the inverted D-bits. Subsequent pointers will contain the new offset value.

Previously incorporated U.S. Pat. No. 5,331,641 discloses methods and apparatus for retiming and realignment of STS-1 signals into an STS-3 type signal. The SPE of an incoming STS-3 type signal is demultiplexed into three STS-1 payloads and fed to three FIFOs, and a byte which is synchronous with the TOH is tracked through the three FIFOs to provide an indication of the FIFO depth. A frame count is also kept to track the number of frames since a last pointer movement. Stuffs or destuffs are generated based on the FIFO depth as well as based on the frame count, with a stuff or destuff generated as quickly as four frames from a previous pointer movement if the FIFO is close to full or close to empty, and less quickly (e.g., at thirty-two frames from a previous pointer movement) if the FIFO is only starting to empty or to fill. The '641 patent mentions a "pointer recalculation block" but does not disclose details about pointer recalculation.

Pointer recalculation is generally accomplished by summing the positive and negative pointer movements with the previous pointer. There are practical limits to the frequency and magnitude of pointer movements and these are part of the SONET standards. In order to assure that pointer movements do not exceed the number permitted by the standards and also in order to avoid unnecessary pointer movements, it is known to "leak" pointer movements. Pointer leaking involves buffering several pointer movements, summing them, and leaking the net pointer movement after a period of accumulating pointer movements. The '641 patent does not teach how to leak pointers. Advantageously, the pointer leak rate is adjustable based on the amount of jitter in the STS signal. Known methods of calculating a pointer leak rate are often cumbersome in terms of the amount of code needed to calculate the leak rate.

Previously incorporated U.S. Pat. No. 6,577,651 discloses a method for retiming and realigning SONET signals and includes demultiplexing STS-1 signals from an STS-3 signal, buffering each of the three signals in a FIFO, determining the FIFO depth over time, and determining a pointer leak rate based in part on FIFO depth and also based on the rate of received pointer movements. The apparatus of the '651 patent includes a dual port RAM FIFO, a write address generator based on the incoming signal clock, a read address generator based on the outgoing signal clock, a FIFO depth counter synchronized to a First_Byte of the SPE written to the FIFO, a FIFO depth latch synchronized to the First_Byte read from the FIFO, and circuitry for calculating leak rate based on FIFO depth and number of pointer movements received over a period of time.

According to the disclosed preferred embodiment, each FIFO is 28 bytes deep. If the depth of a FIFO is 12-16 bytes, no pointer leaking is performed. If the depth is 0-4 bytes, an immediate positive leak is performed. If the depth is 24-28 bytes, an immediate negative leak is performed. If the depth is 5-11 bytes, a calculated positive leak is performed. If the depth is 17-23 bytes, a calculated negative leak is performed. The calculated leak rates are based on the net number of pointer movements (magnitude of positive and negative movements summed) received every 32 seconds (256,000 frames). A look up table is provided with nine leak rates, expressed as a number of milliseconds between leaks. If the number of pointer movements received in the last 32 seconds is less than 32, the leak spacing is 960 ms. The relationship between leak spacing values and the number of pointer movements received in the last 32 seconds is linear. I.e., if the pointer movement rate is doubled, the leak spacing time is halved. The calculated leak rate is preferably reset to minimum spacing every time a new pointer occurs and every time a loss of frame occurs.

Although they are efficient and accurate, the solutions disclosed in the '651 patent have three disadvantages. First, the number of leaked pointers is always slightly greater than the asking rate (i.e. the net number of justifications) because an exact match of the rates cannot be achieved and a lower number would result in buffer underflow/overflow in situations of long-term steady pointer movements. In other words, the system of the '651 patent allows for errors on the safe side by overleaking pointers. While this is not a problem on its own, it can be a problem in a system of retimers each of which allow for this kind of error. As the signal travels through the system, leak rate error can be multiplied resulting in buffer underflow/overflow down the line. Second, since the averaging process is repeated every 32 seconds, there is a possibility of bursty leak rates. Third, there is relatively little control in delaying outgoing pointer justifications for properly sequencing cascaded retimers.

SUMMARY OF THE INVENTION

It is therefore an object of the invention to provide methods and apparatus for calculating a pointer leak rate for retiming a SONET signal.

It is another object of the invention to provide methods and apparatus for calculating a pointer leak rate for retiming a SONET signal which can switch between slower and faster leak rates.

It is a further object of the invention to provide methods and apparatus for calculating a pointer leak rate for retiming a SONET signal which efficiently absorbs short-term pointer bursts.

It is also an object of the invention to provide methods and apparatus for calculating a pointer leak rate for retiming a SONET signal which provides a leak rate substantially slower than the net asking rate.

In accord with these objects, which will be discussed in detail below, the methods of the present invention include demultiplexing STS-1 signals from an STS-N signal, buffering each of the STS-1 signals in a FIFO, determining the FIFO depth over time, and the rate of received pointer movements. Two pointer leak rates (fast and slow) are calculated based on the net number of pointer movements received during a sliding window of time. A pointer leak rate is chosen from among fast, slow and immediate based on the fullness of the FIFO.

The apparatus of the invention includes a dual port RAM FIFO, a write address generator based on the incoming signal clock, a read address generator based on the outgoing signal clock, a FIFO depth counter synchronized to First_Byte of the SPE written to the FIFO, a FIFO depth latch synchronized to the First_Byte read from the FIFO, and circuitry (and/or software) for calculating leak rate two leak rates based on the net number of pointer movements received over sliding window of time and for choosing among fast, slow and immediate based on the fullness of the FIFO.

According to the presently preferred embodiment, each FIFO is 29 bytes deep. If the depth of a FIFO is 12-17 bytes, no pointer leaking is performed. If the depth is 8-12 bytes or 17-21 bytes, a slow pointer leak rate is set. A slow pointer leak rate is slower than the asking rate. If the depth is 4-8 bytes or 21-25 bytes, a fast pointer leak rate is set, i.e. faster than the asking rate. If the depth is 0-4 bytes or 25-29 bytes, pointer movements are immediate.

The calculated leak rates are based on the net number of pointer movements (magnitude of positive and negative movements summed) received during a sliding window of n×32 seconds (n×256,000 frames). Depending on the size of the sliding window, the responsiveness of a feedback control loop may be controlled. Introduction of this controllable damping in the averaging process, avoids sudden variation in pointer leak rates, and allows a better capability to ride out pointer bursts. It is possible to respond to short-term higher net pointer justification asking rates with a slower outgoing pointer leak rate. If the buffer levels continue to build, then the retimer automatically adapts to the system conditions by switching to a faster pointer leak rate.

Additional objects and advantages of the invention will become apparent to those skilled in the art upon reference to the detailed description taken in conjunction with the provided figures.

BRIEF DESCRIPTION OF THE DRAWINGS

FIG. 3 is a pseudocode listing of a pointer generation rate algorithm according to the invention.

DETAILED DESCRIPTION OF THE PREFERRED EMBODIMENTS

Figure 1:
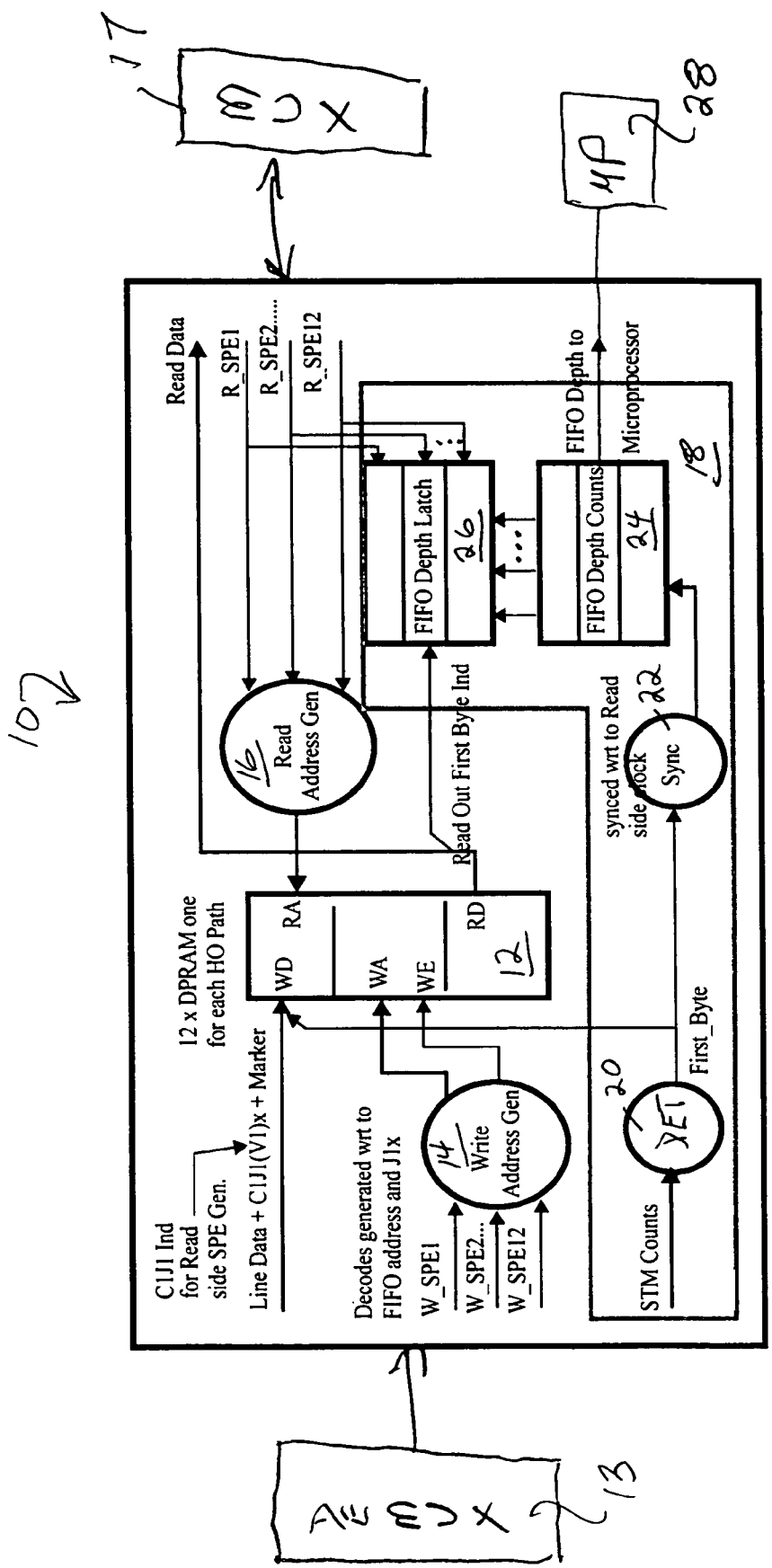
FIG. 1 is a high level block diagram of an apparatus for performing one of the methods of the invention.

Turning now to FIG. 1, an apparatus 10 according to the invention includes a plurality of FIFOs (twelve as illustrated) preferably implemented in a dual port RAM 12, a write address generator 14, a read address generator 16, and a FIFO depth measurement circuit 18. The RAM 12 has a data input WD (write data), a data output RD (read data), an address input WA (write address), an address output RA (read address), and a write enable input WE. The write address generator 14 receives input from a demultiplexer 13 regarding the writing of data of twelve SPEs, SPE1, SPE2, ... SPE12, provides output to the WA and WE inputs of the RAM 12. The read address generator receives input from a multiplexer 17 regarding the reading of SPE1, SPE2, ... SPE12 data and provides output to the RA input of the RAM 12.

The FIFO depth measurement circuit 18 includes a First_Byte detector 20, a synchronizer 22, twelve FIFO depth counters 24, and twelve FIFO depth latches 26. The First_Byte detector 20 receives STM counts from the aforementioned demultiplexer 13 and provides an indication of the First_Byte (first byte after the nine TOH bytes in the first row of a frame) to the synchronizer 22 which provides output to the FIFO depth counters 24. The FIFO depth latches 26 receive input from the FIFO depth counters 24, the RD output of the RAM 12 and the SPE1, SPE2, ... SPE12 indications of the aforementioned multiplexer 17. The FIFO depth counters 24 and the FIFO depth latches 26 cooperate to provide twelve FIFO depth counts which are used by a processor 28 to determine a pointer leak rate as described in more detail below with reference to FIGS. 2 and 3.

The data input WD of the FIFO 12 receives line data, C1J1 and V1 pulses, and the First_Byte indication or a Marker. Each word in the FIFO is ten bits wide and comprises the Data byte, a 'Marker' or 'First ByteIndicator' (that is tied to the frame, typically, this indicator is appended with the data byte immediately following the C1 byte, hence, 'First Byte'), and the SPE start indication or the 'SPE Start Indicator', which is equivalent of the J1x pulse, carried within the J1x byte. The J1x pulse written into the FIFO is used by the Read end circuitry to locate the start of the SPE so that the SPE may be passed transparently with the appropriate POH bytes through the retimer. Also, the written in J1x pulse may be used to load the Read end pointer bytes with the input pointer offset. The 'Marker' is used for depth measurement after synchronization. Optionally, the V1x pulses if available, can also be written in. The V1 pulse is not needed for a Read end SPE rebuild process, and may be transmitted transparently through the FIFO if desired; the V1 pulse, or the TUSPE information, is irrelevant as far as the HO (high order) Path is concerned.

The writing to the FIFO 12, is performed by the write address generator 14 when a valid data byte is available on the Line-Data input. This valid data byte is indicated by the W_SPE1-W_SPE12 lines. The read address generator 16 increments every time one of the R_SPE1-R_SPE12 lines is active. The output of the FIFO includes the data, control information, and the First_Byte indication.

The depth of the FIFO is measured from a fixed location (First_Byte) in the SONET frame. Although the actual depth of the FIFO is determined by the write address and the read address, it can not be measured directly by subtraction because the read and write address generators are running on two different clocks. In order to overcome this problem, the invention uses the "First_Byte" marker pulse generated on the write side of the FIFO. This marker is written into the FIFO along with the other bytes and controls. This "First_Byte" marker is passed on directly to the read side, is synchronized with the read clock domain and is used to initialize the depth counters. These depth counters then increment every time the read address generator increments. When the First_Byte marker is read out from the FIFO, the FIFO depth value is passed on to the processor 28 for use in leak rate calculation as described in more detail below. According to the presently preferred embodiment, the processor used to calculate the leak rate is a MIPS architecture embedded RISC processor from TranSwitch Corporation, Shelton, Conn. It will be appreciated, however, that a state machine or gate array could be arranged to calculate the leak rate.

Figure 2:
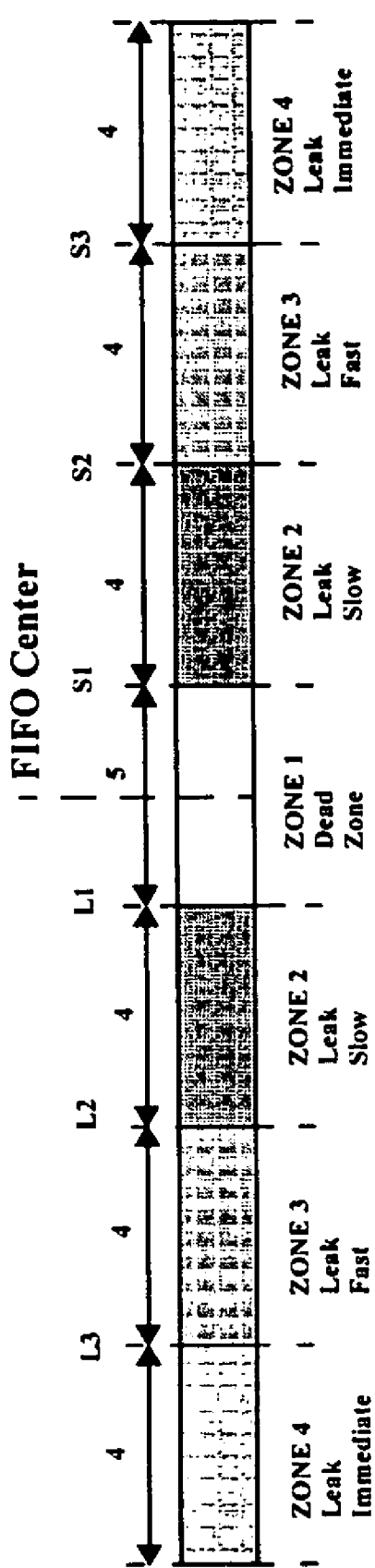
FIG. 2 is a schematic illustration of a FIFO illustrating different leak rate zones.

As mentioned above the pointer leak rate is based on the FIFO depth as well as on the net number of pointer movements over time. FIG. 2 illustrates the first step in determining the pointer leak rate using a 29-byte FIFO. The actual FIFO size is 32-bytes providing an extra 3-bytes for uncertainty during filling so that the FIFO can withstand an uncertainty in the exact instant of depth measurements. The FIFO depth is considered with reference to seven zones. A first "dead" zone is at the center of the FIFO and comprises five bytes. There are three four-byte zones on each side of the dead zone. These are indicated in FIG. 2 as S1, S2, S3 and L1, L2, L3. It will be appreciated that the FIFO illustration fills from right to left. When the FIFO is about half full, i.e. in the dead zone, no pointer movements are performed. When the FIFO is less than about half full, in the zones to the right of the dead zone, positive pointer leaks are performed and when the FIFO is more than about half full, in the zones to the left of the dead zone, negative pointer leaks are performed. According to one aspect of the invention, leaks are performed at three rates: a slow rate, a fast rate, and an "immediate" rate. The "immediate" rate is the maximum permissible by the SONET standard, i.e. every fourth frame. The fast rate and the slow rate are calculated according to an algorithm. An exemplary algorithm is illustrated in FIG. 3 in the form of pseudocode.

Turning now to FIG. 3, the exemplary algorithm will be understood using the variable definitions listed below in Table 1.

TABLE 1

| | |
|---|---|
| Tx | Time interval of pointer measurement, 16-64 seconds, 32 seconds preferred |
| NTM | Window size in number of time intervals, 1-16, 16 preferred |

TABLE 1-continued

| | |
|---|---|
| nt | Number of cummulative time intervals over which the average is being taken, which grows to the maximum of NTM |
| NP [i] | Number of pointers observed during relative time period i |
| STa | Spacing time (long), i.e. slow leak rate |
| STb | Spacing time (short), i.e. fast leak rate |
| LS | Maximum pointer spacing time, e.g. 10 seconds |
| Ka, Kb | Constant gain parameters based on initial simulations |

The code listing of FIG. 3 starts at line 1. At lines 2-8 the variables STa, STb, and NP[i] are reset. The numbers of pointers observed are set to zero. In this example, the spacing times are both set to 3.75 ms. At line 9, the number of time intervals is set to one. The routine at lines 10-44 repeats so long as the FIFOs do not overflow. If there is an overflow, the program restarts at line 46. The numbers of positive and negative pointers are read from the FIFO status registers at lines 12 and 13 and the sum is set to zero at line 14. A loop from lines 15 through 19 is performed for each time period i in the number NTM where the sum of the pointers is taken for each interval. This is where the oldest bucket is discarded and the newest bucket is added in the sliding window. At lines 20-21, the sum is increased by the net number of pointer counts in the last time interval. The sum is then divided by time interval at line 22 yielding an average. The window size is increased at lines 23-24 up to the maximum NTM. If the average is zero as determined at line 25, both rates STa and STb are set to the maximum LS. If the constant Kb divided by the average is greater than or equal to LS as determined at line 30, then again, both STa and STb are both set equal to LS, since Kb the faster rate (or smaller spacing). If the constant Kb divided by the average is less than LS and the constant Ka divided by the average is greater than or equal to LS as determined at line 35, STa is set to LS and STb is set to Kb divided by the average. If none of the above three boundary conditions is true (which is the normal expected case), then the rate STa is set to Ka divided by the average and the rate STb is set to Kb divided by the average at lines 42 and 43.

Those skilled in the art will appreciate that the system of the present invention can be configured in several ways. For example, the size of the buffer zones shown in FIG. 2 can be altered through software and/or register settings. In addition as described above with reference to FIG. 3, the initial spacing values inita and initb are selectable; the time duration of pointer measurements Tx and the number of time intervals measured NTM are programmable; and the maximum spacing time LS as well as the constants Ka and Kb are configurable.

Ka and Kb are programmable constants with Ka>1 and Kb<1. Typical values used for simulations are Ka=1.05 and Kb=0.95.

There have been described and illustrated herein methods and apparatus for retiming SONET signals. While particular embodiments of the invention have been described, it is not intended that the invention be limited thereto, as it is intended that the invention be as broad in scope as the art will allow and that the specification be read likewise. Thus, while particular hardware components have been disclosed, it will be appreciated that other equivalent components could be used as well. In addition, while a particular algorithm has been disclosed for calculating the slow and fast leak rates, it will be understood that other algorithms can be used. It will therefore be appreciated by those skilled in the art that yet other modifications could be made to the provided invention without deviating from its spirit and scope as claimed.

What is claimed is:

1. A method for retiming and realigning SONET signals, comprising:
    a) demultiplexing STS-1 signals from an STS-n signal;
    b) buffering each of the STS-1 signals in a FIFO;
    c) determining FIFO depth over time;
    d) indicating a calculated slow leak rate when the FIFO depth is more than a first threshold and less than a second threshold from half full; and
    e) indicating a calculated fast leak rate when the FIFO depth is more than a second threshold and less than a third threshold from half full.

2. A method according to claim 1, further comprising:
    f) indicating an immediate leak when the FIFO depth is more than said third threshold from half full.

3. A method according to claim 2, wherein:
    said first threshold is greater than or equal to two but less than six bytes,
    said second threshold is greater than or equal to six but less than ten bytes, and
    said third threshold is greater than or equal to ten bytes.

4. A method according to claim 1, wherein:
    said calculated slow leak rate and said calculated fast leak rate are based on the number of pointers observed during a period of time.

5. A method according to claim 4, wherein:
    said period of time is a sliding window.

6. A method according to claim 5, wherein:
    said calculated slow leak rate and said calculated fast leak rate are based on the average number of pointers observed during said sliding window.

7. A method according to claim 4, wherein:
    said period of time is a multiple of thirty-two seconds.

8. A method according to claim 4, wherein:
    said period of time is programmable.

9. A method according to claim 4, further comprising:
    f) setting an initial value for said fast leak rate; and
    g) setting an initial value for said slow leak rate.

10. A method according to claim 9, wherein:
    said initial value for said fast leak rate and said initial value for said slow leak rate are the same value.

11. A method according to claim 10, wherein:
    said same value is 3.75 ms.

12. A method according to claim 1, wherein:
    said first threshold is greater than or equal to two but less than six bytes and said second threshold is greater than or equal to six but less than ten bytes.

13. A method according to claim 1, wherein:
    said first, second, and third threshold are programmable.

14. An apparatus for retiming and realigning SONET signals, comprising:
    a) a dual port RAM FIFO;
    b) a write address generator based on an incoming signal clock;
    c) a read address generator based on an outgoing signal clock;
    d) a FIFO depth counter synchronized to First_Byte of an Synchronous Payload Envelope (SPE) written in FIFO;
    e) a FIFO depth latch synchronized to First_Byte read from the FIFO;
    f) means for indicating a calculated slow leak rate when the FIFO depth is more than a first threshold and less than a second threshold from half full; and g) means for indicating a calculated fast leak rate when the FIFO depth is more than a second threshold and less than a third threshold from half full.

15. An apparatus according to claim 14, further comprising:
   h) means for indicating an immediate leak when the FIFO depth is more than said third threshold from half full.

16. An apparatus according to claim 15, wherein:
said first threshold is greater than or equal to two but less than six bytes,
said second threshold is greater than or equal to six but less than ten bytes, and
said third threshold is greater than or equal to ten bytes.

17. An apparatus according to claim 14, wherein:
said calculated slow leak rate and said calculated fast leak rate are based on the number of pointers observed during a period of time.

18. An apparatus according to claim 17, wherein:
said period of time is a sliding window.

19. An apparatus according to claim 18, wherein:
said calculated slow leak rate and said calculated fast leak rate are based on the average number of pointers observed during said sliding window.

20. An apparatus according to claim 17, wherein:
said period of time is a multiple of thirty-two seconds.

21. An apparatus according to claim 14, wherein:
said first threshold is greater than or equal to two but less than six bytes and said second threshold is greater than or equal to six but less than ten bytes.

22. An apparatus according to claim 14, wherein:
said means for indicating is a programmed processor.

23. An apparatus according to claim 14, wherein:
said means for indicating is a state machine.

24. An apparatus according to claim 14, wherein:
said means for indicating is a gate array.

25. An apparatus for retiming and realigning SONET signals, comprising:
   a) a dual port RAM FIFO;
   b) a write address generator based on an incoming signal clock;
   c) a read address generator based on an outgoing signal clock;
   d) a FIFO depth counter synchronized to First_Byte of an Synchronous Payload Envelope (SPE) written in FIFO;
   e) a FIFO depth latch synchronized to First_Byte read from the FIFO;
   f) a logic element indicating a calculated slow leak rate when the FIFO depth is more than a first threshold and less than a second threshold from half full and a calculated fast leak rate when the FIFO depth is more than a second threshold and less than a third threshold from half full.

26. An apparatus according to claim 25, wherein:
said logic element is a processor.

27. An apparatus according to claim 25, wherein:
said logic element is a gate array.

28. An apparatus according to claim 25, wherein:
said logic element is a state machine.

* * * * *